United States Patent [19]

Campbell et al.

[11] 4,068,405
[45] Jan. 17, 1978

[54] AUTOMATIC FOOD PLANT PRODUCTION

[75] Inventors: Joseph W. Campbell, Glendale; Ralph Siebert, La Canada, both of Calif.

[73] Assignees: Joseph W. Campbell, Glendale; Ralph Siebert, La Canada; Harry R. Highkin, Sherman Oaks, all of Calif.

[21] Appl. No.: 612,307

[22] Filed: Sept. 11, 1975

[51] Int. Cl.² .............................................. A01G 31/00
[52] U.S. Cl. .................................................... 47/65
[58] Field of Search .............................. 47/1.2, 14–17, 47/59, 60, 61, 62, 63, 64, 65, 14, 15, 16

[56] References Cited

U.S. PATENT DOCUMENTS

| 1,793,626 | 2/1931 | McCormick | 47/1.2 X |
| 3,300,896 | 1/1967 | Lunstroth | 47/1.2 |
| 3,425,158 | 2/1969 | Kyle | 47/1.2 |
| 3,432,965 | 3/1969 | Smith et al. | 47/1.2 |
| 3,461,605 | 8/1969 | Stanhope | 47/17 |
| 3,529,379 | 9/1970 | Ware | 47/17 |
| 3,664,061 | 5/1972 | Oepen | 47/1.2 |
| 3,771,258 | 11/1973 | Charney | 47/1.2 |
| 3,824,736 | 7/1974 | Davis | 47/17 |

FOREIGN PATENT DOCUMENTS

| 932,961 | 9/1973 | Canada | 47/1.2 |

OTHER PUBLICATIONS

Leopold, A. C., et al. Selected pages from *Plant Growth and Development*, 1975 Von Hoffmann Press, Inc., pp. 360–362.

Primary Examiner—Clifford D. Crowder
Assistant Examiner—James R. Feyrer
Attorney, Agent, or Firm—John E. Wagner

[57] ABSTRACT

Disclosed are apparatus and method for establishing and maintaining a controlled environment for the growth of food yielding plants. The apparatus includes an enclosure having a plurality of artificial light sources positioned over a growing region. Planting areas constitute suitable trays which are mounted for automatic or controlled movement past the light sources and to a work area where all planting, cultivating, crop management and harvesting is accomplished. The necessity of labor expense is thereby reduced.

Photo periodism or the enhanced growth rate of plants with light cycling is easily optimized by controlling the speed of movement of the plants. Size and position of the lamps also is varied to optimize growth. Growth enhancement through plant movement is attained.

2 Claims, 8 Drawing Figures

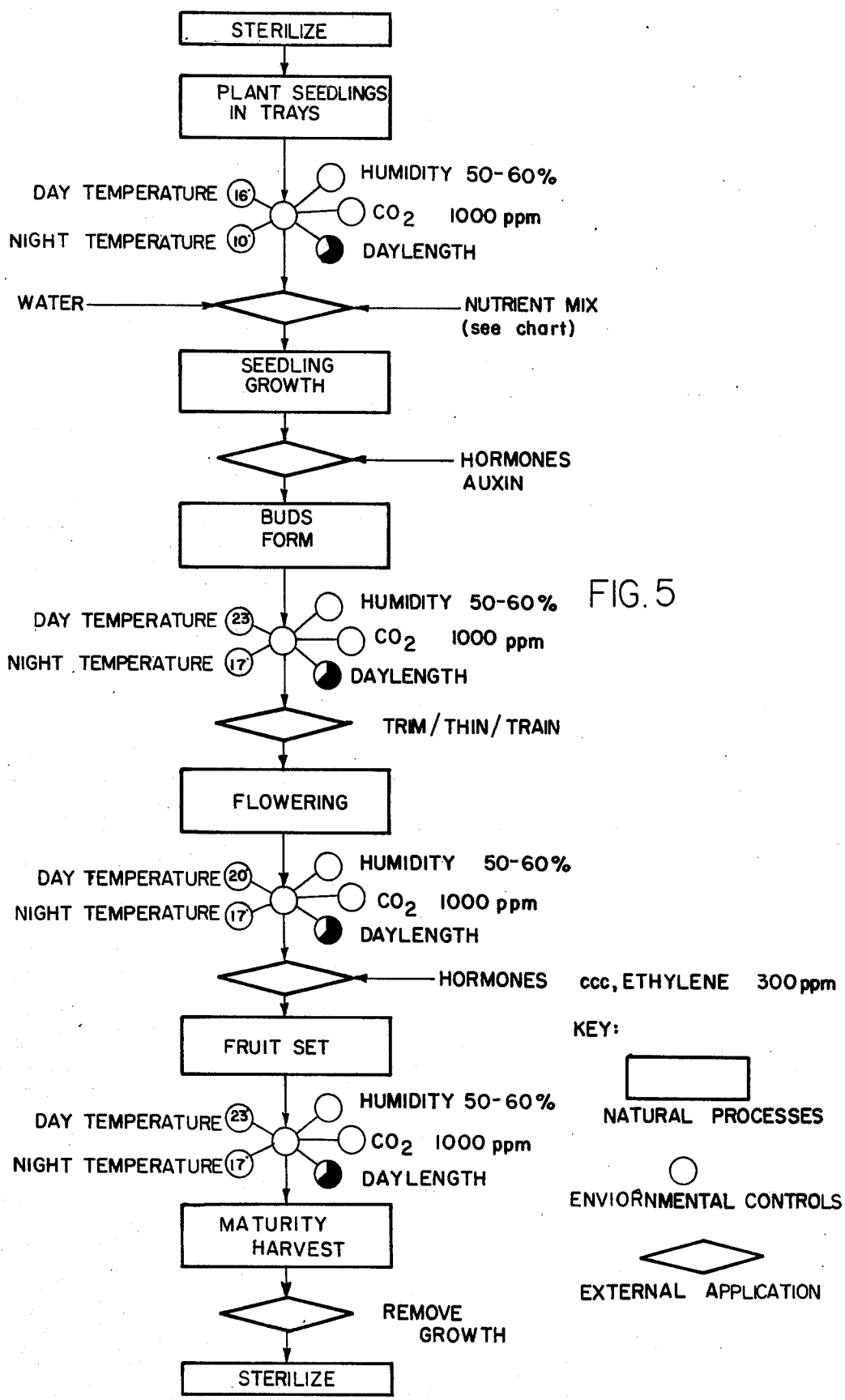

AUTOMATIC FOOD PLANT PRODUCTION

BACKGROUND OF THE INVENTION

The growth of ornamental and food plants in controlled environments has been accomplished in the past in a variety of ways. The greenhouse is the classic form of partially controlled environment, the origin of which is lost in antiquity. The greenhouse serves to allow the control of humidity, temperature and air-born damage from wind and hail. On occasions, the greenhouse, having a transparent roof for the inlet of sunlight, has its growing day lengthened by the addition of artificial lighting.

Another form of controlled environment growing is sand culture in which sand or other particulate media is simply a replacement for soil. Still another form of controlled environment is water culture, called hydroponics, in which the plants are grown with their roots immersed in liquid solution supplying the needs of moisture plus nutrients. Another form of controlled environment is the sub-irrigation culture in which water type beds or benches are filled with an inert material which is irrigated from the bottom of the bed. These are all performed usually within enclosures with sunlight as the principal source of light.

It has been learned that plants may be raised totally under artificial light. Such systems employing a chamber with totally artificial lighting is described and disclosed in the *Canadian Journal of Plants Science*, Volume 52, pages 854–856, September, 1972. Such chambers, for example, are of wood with reflectorized plastic lining and with a number of fluorescent lamps supplemented by incandescent lamps at the top of the chamber directed towards a growing area below. Conditioned air and nutrients are just introduced into the chamber as required for plant growth.

The development of artificial lighting for certain ornamental plants, particularly those of a seasonal nature, has progressed to a point where lamps are designed to provide the desired wave length for the growth modification sought. The periods of illumination and darkness to correspond with the photo periodicity of particular plants has been accomplished by timers which energize the lamps for the desired light cycling.

Probably the most sophisticated of the controlled environmental plant systems is the phyotron or large controlled environmental enclosure as constructed in France and the United States and disclosed in *The World of Plants*, Volume 3, *Encyclopedia of Life Science*, copyright 1965, The Doubleday Company, Inc., Garden City, New York, pages 96–98. In each of the foregoing approaches, a number of factors affecting plant growth have been controlled principally for experimental purposes. If commercial production of food plants is sought on an economic basis, a major element of cost is still untouched by these prior art systems.

In particular, the steps of planting, plant managing and harvesting are still accomplished in the traditional manner of moving a complex machine or a skilled worker to each plant at the appropriate time to perform the required function. In some of the most modern environmentally controlled plant systems available today, the cultivating is still accomplished employing stoop labor methods by laborers as has been used since Biblical days.

Moreover, the characteristic of certain plants that their growth is enhanced by movement of their parts, as by mild wind, has been eliminated or ignored in controlled environments heretofore.

BRIEF STATEMENT OF THE INVENTION

We have instead developed a controlled environment employing light sources, plant supports and a work station to which the plants are transported for plant management. The plants move past the illumination sources at a rate related to their photo periodism for their optimum growth. The movement actually enhances growth.

The apparatus brings each plant station to the worker who may have all tools and materials available and may sit or stand as the most efficient work position may be determined, and at that work station perform the same or different plant management steps as may be required.

In one embodiment of this invention, a number of multiple layer continuous chain drive systems each support an array of plant trays and transport them below respective light sources. Each of the systems transports the plants to the work station whereby a number of identical or different plants may be available for the worker or workers to perform the necessary functions. Where the transportation cycle is at a low rate for a plant, an optimum work load for the worker or workers may be achieved by larger trays whereby the worker has sufficient time to perform all of the necessary functions as each tray is passed by. An improved plant tray support and transport mechanism is also disclosed.

We further have developed, we believe the first totally controlled environmental growing chamber.

A process for employing the cyclical movement of plants past a light source at their optimum photo period and to a work station for plant management is disclosed.

BRIEF DESCRIPTION OF THE DRAWINGS

This invention may be more clearly understood by the following Detailed Description and by reference to the drawing in which:

FIGS. 5 and 5a are process diagrams of this invention;

DETAILED DESCRIPTION OF THE INVENTION

As indicated above in the Background of this Invention, there have been various attempts to partially control the environment of ornamental and food plants. We now are in a position to control virtually all known aspects of plant growth, flowering, fruiting, and the flavor, by reason of our ability in our environmental chamber of controlling each of the following parameters.

Temperature periodicity
    Photo-periodicity
    Root moisture
    Light quality (especially red/far red ratio)
    Gaseous atmosphere - $O_2$, $CO_2$, ethylene gas, CO
    Metabolic inhibitors (maleic hydrazide)
    Humidity
    Growth medium
    Foliage movement
    Weed and disease control
    Timing of all steps including cultivation Also given a totally controlled environment, the precise and isolated effect of each of the above factors affecting growth can be controlled individually while maintaining the remaining factors substantially constant.

Figure 1:
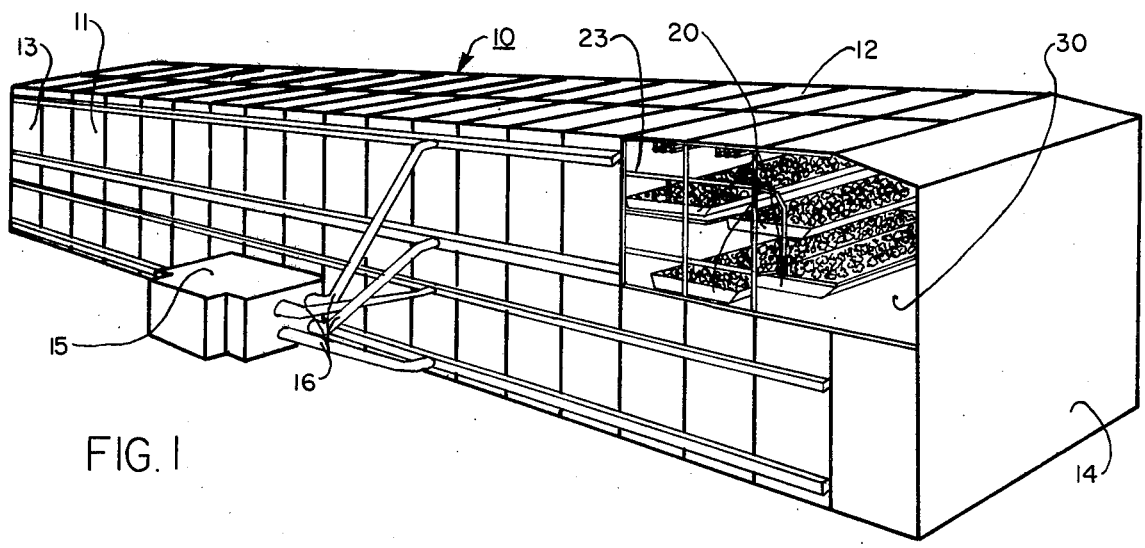
FIG. 1 is a perspective view of the exterior of a controlled environment chamber in accordance with this invention.
Figure 2:
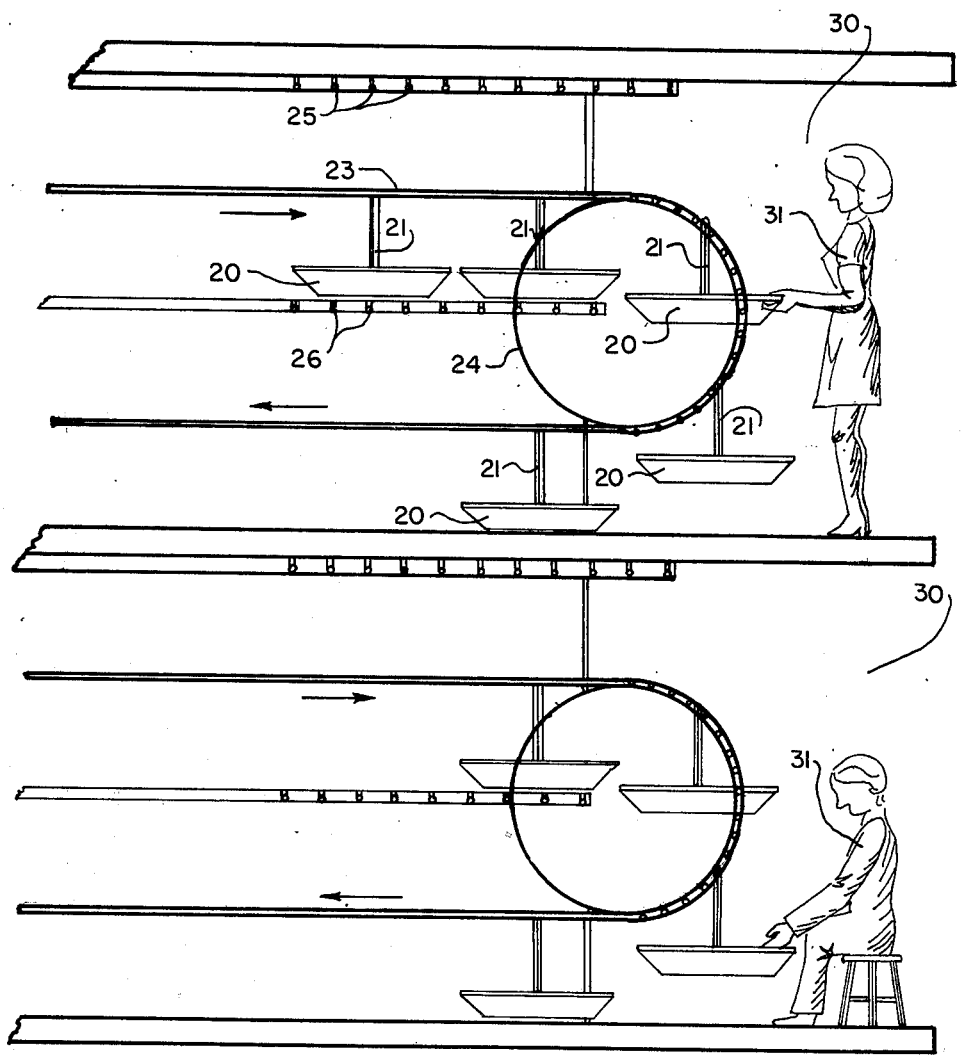
FIG. 2 is a fragmentary side sectional view of the chamber of FIG. 1.

All of these are achieved employing the environmental chamber as shown in FIGS. 1 and 2. The chamber 10 is illustrated in FIG. 1 as constituting an elongated enclosure or building 11 which is substantially sealed and in contrast with conventional greenhouses, has its upper surface 12 preferably light impervious. The roof or upper surface 12 plus side walls 13 and end wall 14 may be selected principally for their structural properties and also may aid or inhibit thermal transmission to assist the control of temperature of the chamber. Of course, in colder climates for year around growth, the walls will be insulated, as will also be the case in extremely hot climates such as desert regions. Examples of suitable materials for the walls and upper structure for typical different environments are:

| Climate or geographic area | Enclosure material |
| --- | --- |
| most North American areas | metal skeletal frame polyurethane foam insulation, 1 mild steel exterior shell interior wall, reflective Mylar |
| Arctic and Desert regions | same as above with 3" foam |

Suffice it to say that the enclosures must meet the local geographic conditions and provide an internal environment which may be controlled in temperature, light, humidity, gaseous content of the atmosphere, while maintaining conditions which are habitable by workers periodically. Each of the gaseous atmospheric additives are supplied by a gas storage chamber or facility 15 having a number of ducts 16 thereto. Typically, these ducts will supply the following:

Heated or cooled or ambient temperature air; $CO_2$;
    Ethylene gas; and on occasion CO.

One of the significant features of this invention is illustrated clearly in both FIGS. 1 and 2 in that the plants to be grown are supported in a number of trays 20, each of which are supported themselves on arms 21, best shown in FIG. 2, from an endless track 23 with a suitable end drum 24 appearing in FIG. 2 but omitted in FIG. 1 for clarity. The trays 20 are each advanced by the endless chain or similar drive 23 below an array of lamps 25 appearing in FIG. 2 while on the upper pass of the endless chain 23 and below a tray 26 appearing in FIG. 2 on the return passage. Each of these trays moves at a rate which is related to the photo periodicity desired and passes a work station 30 where an employee 31 is in position to provide all manual cultivating actions including medium preparation in the trays, planting, weeding, thinning, fertilizing as required, and harvesting. None of the backbreaking activities commonly associated with much agricultural field work are involved employing this invention. Where preliminary medium preparation, planting, and thinning operations are being accomplished, the workman 31 may normally assume a standing position where he has direct view of the upper surface of each tray 20 containing its medium and an overview of each planting. Where the plants are more mature, and cultivating below the plants and harvesting are desirably accomplished, these may be done from a seated position without movement as shown in the bottom level of the two level structure of FIG. 2. In each case, the plants are advanced to the workman greatly enhancing the efficiency of the agricultural worker. Of further value is the fact that the relative movement of the plants with respect to the atmosphere simulates a mild breeze condition which has been considered by some experts to be helpful to growth. The plants moved on an endless chain are subject to slight vibration and therefore subject to the equivalent of having their foliage moved gently by mild wind.

In the simplest embodiment shown in FIG. 1, only a single array of lamps 25 on the upper pass is used while on the return pass, at the lower level, the chamber is of relatively lower illumination thereby developing photo periodicity of approximately 60% lighted, 40% darkened environment. This roughly approximates the growing day.

In plants where photo periodicity has not been established to be critical or where photo periodicity is established by turning off all lights, the embodiment shown in FIG. 2 may be used. In this case, the plants are subject to illumination on both the upper run and the return or lower run.

Figure 3:
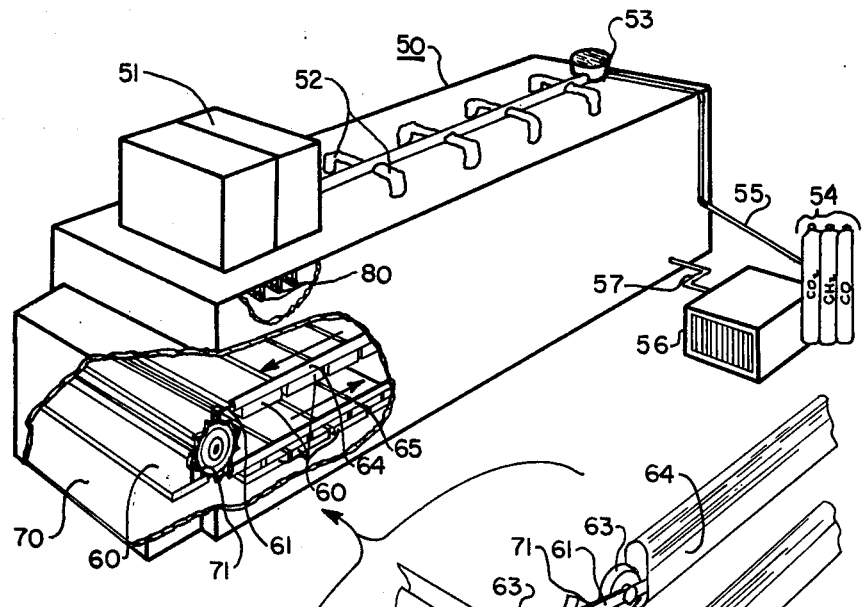
FIG. 3 is a perspective view of an alternate embodiment of this invention with portions broken away to show the transport mechanism.

Now referring to FIG. 3, an alternate embodiment of the apparatus of this invention is shown having specific environmental controls illustrated. In this case, chamber 50 includes an air conditioning, humidifying unit 51 mounted on the roof with distribution ducts 52 extending along the length of the roof of chamber 50. At one end of the duct system 52 is a manifold 53 into which are injected into the atmosphere the supplement gases as required. These may be supplied from generators or from tanks as shown in FIG. 3. Three tanks 54 are connected by a piping 55 to the manifold 53. These tanks for example may include $CO_2$, ethylene gas $CH_2$, or CO. Nutrients and acid for PH control are supplied from reservoirs 56 via piping 57. Within the enclosure 50 an array of trays 60 are again suspended from an endless link chain 61 by support arms 62 best seen in FIG. 4. The endless chain includes a number of rollers 63 which travel during the horizontal path in channel supports 64 on the upper pass and 65 on the return pass. A single level work station 70 is located at one end of the building. We noted that the only access to the building normally required except for equipment maintenance is in the region of the work station 70 since all of the plants and all trays for that matter pass the work station.

Suitable controls for the injection of gas, control of humidity, temperature, nutrients, can be at the control station unshown in the drawing but located either at each enclosure or at a central control station.

Figure 4:
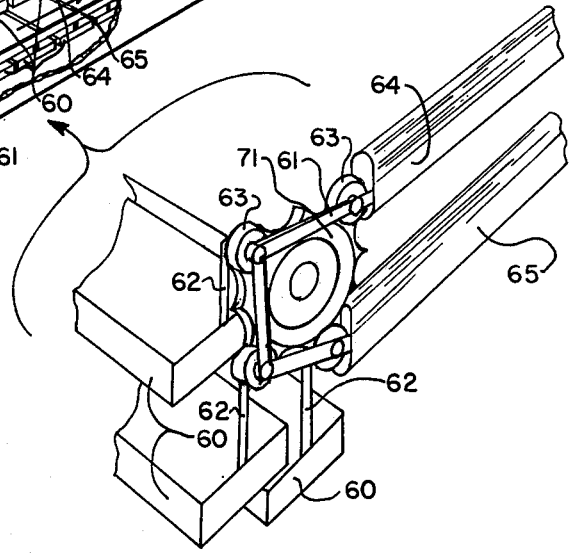
FIG. 4 is a fragmentary perspective view of one form of drive mechanism in accordance with this invention.

Employing the link chain mechanism of FIGS. 3 and 4, the plants on movement around the end sprocket 71 undergo slightly intermittent motion providing an inherent shaking or movement deemed helpful to plant growth.

Shown in FIG. 3 positioned over the tray 60 on their upper pass on the upper track 64 are a number of lamps, for example, 500 215 watt fluorescent lamps, type F96T12 1500, of the General Electric Company where the chamber 50 is approximately 10,000 cubic feet in size. These lamps are in an array 80, 6 inches on center, extending normally transverse in the direction of movement of the trays shown by the arrows in FIG. 3. These lamps provide a controllable level of illumination at the tray level 60 under full illumination of 40-80 watts per square foot. This level may be affected significantly by the internal wall surface, e.g. aluminizing vs. absorbtive. As shown in FIG. 3, there is no illumination on the return pass so again photo periodicity is achieved by the rate of movement of the trays. Given the arrangement shown in FIG. 3 with the upper trays 60 shielding the lower trays, the difference in level of illumination between the upper pass in direct illumination and the lower shielded pass, is in the order of 20 to 1, giving a change in level of illumination without complete or total darkness at the lower level. If darkness is desired, then the location of a divider running parallel to the length of the chamber 50 between the upper and the lower rows of trays 60 will isolate the lower set of trays 60 almost totally from the light sources above. Under these conditions, rather accurate simulation of day and night conditions is achieved.

Figure 5A:
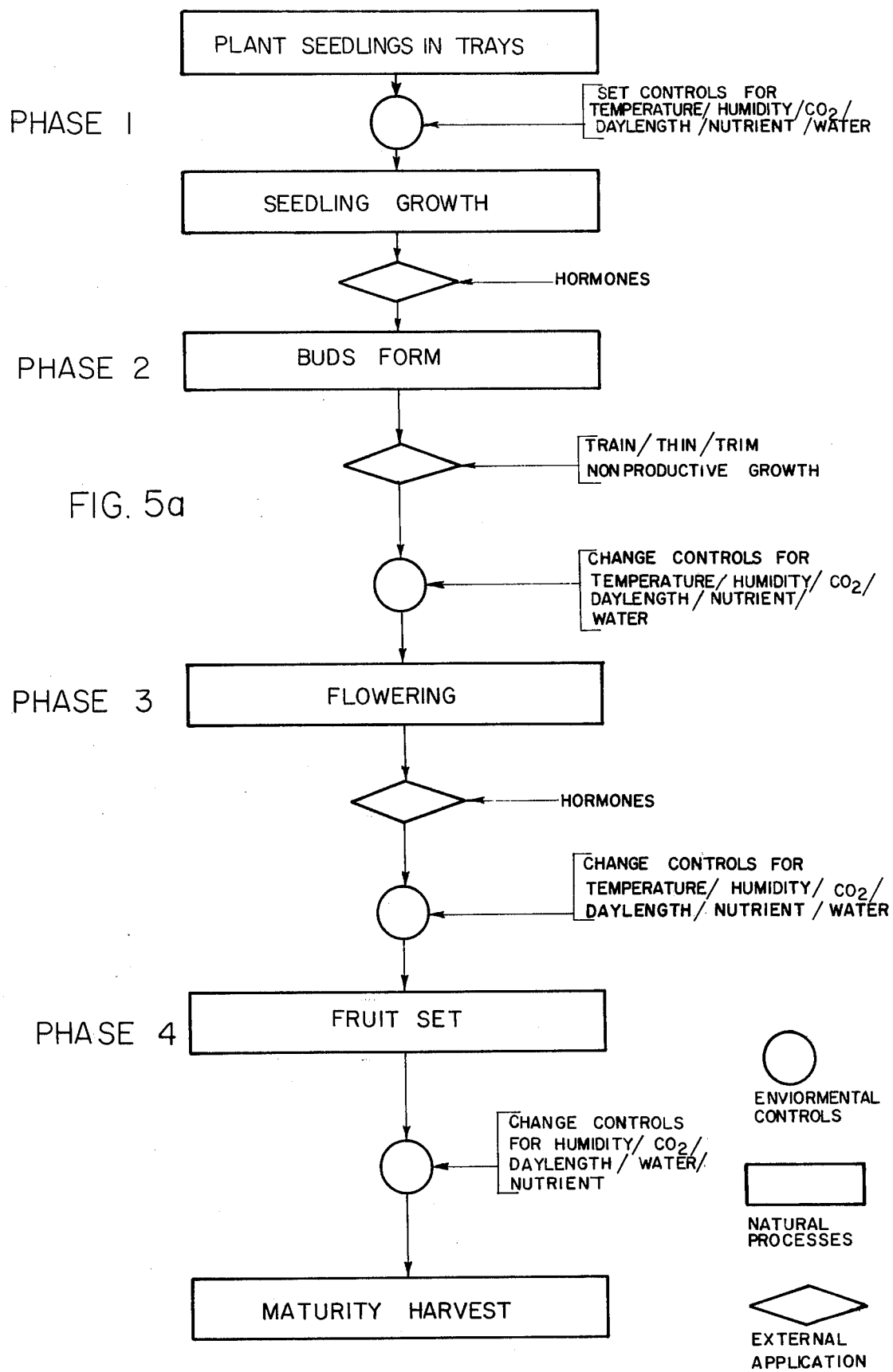

Employing the chamber of FIGS. 1 or 2 or that of FIG. 3, still the same basic growth cycle exists and this, as modified by the effects of the environmental chamber, is best illustrated in the process flow diagram of FIG. 5. In FIG. 5, each of the natural processes employed in good agricultural practice are indicated by rectangle while the external applications and operational steps are denoted by the diamonds. The environmental controls which are available employing this invention are indicated by circles, each representing a 24 hour clock with the blackened areas denoting the time of application for a typical growing cycle for plants such as is shown in the following chart. The chart depects the conditions and nutrients for each of the four phases of plant development as shown in FIG. 5a, along with certain other nutrients or parameters which have been found by others to enhance growth.

In FIG. 5 the parameters and controls for one food crop, namely tomatoes, have been selected and illustrated.

LYCOPERSICON ESCULENTUM

| | | | Tomato | | |
|---|---|---|---|---|---|
| | Phase | 1 | seed to bud | | |
| | | 2 | bud to flower | | |
| | | 3 | flower to fruit | | |
| | | 4 | fruit set to harvest | | |
| Phase | | 1 | 2 | 3 | 4 |
| Temp ° C | | | | | |
| Day | | 16° | 23° | 20° | 23° |
| Night | | 10° | 17° | 17° | 17° |
| Day length hrs | | 16 | 16 | 16 | 16 |
| Humidity % | | | 50%-60% | | |
| Nutrient Solution PPM | | | | | |
| K | | 180. | 180. | 180. | 180. |
| P | | 180. | 180. | 180. | 180. |
| N | | 400. | 400. | 400. | 450. |
| Ca | | 180. | 180. | 250. | 250. |
| Mg | | 24. | 24. | 24. | 24. |
| B | | 25. | 25. | 3. | 25. |
| Fe | | .5 | .5 | .5 | .5 |
| Mn | | .25 | .25 | .25 | .25 |

-continued
LYCOPERSICON ESCULENTUM

| | | | Tomato | | |
|---|---|---|---|---|---|
| | Phase | 1 | seed to bud | | |
| | | 2 | bud to flower | | |
| | | 3 | flower to fruit | | |
| | | 4 | fruit set to harvest | | |
| Phase | | 1 | 2 | 3 | 4 |
| Micro Nutients | | | | | |
| Cu | | .05 | .05 | .05 | .05 |
| Zn | | .05 | .05 | .05 | .05 |
| $H_2O$ ph | | | 6.5-7.0 | | |
| $CO_2$ PPM | | 1000 | 1000 | 1000 | |
| Hormones | | | Auxin | CCC | Ethylene 300 ppm |
| Light Intensity foot candles | | | 2000-3000 fc | | |
| Other | | root temp. 10-13° | | | |

GLYCINEMAX

| | | | Soybean | | |
|---|---|---|---|---|---|
| | PHASE | 1 | seedling to bud | | |
| | | 2 | bud to flower | | |
| | | 3 | flower to fruit | | |
| | | 4 | fruit set to harvest | | |
| Phase | | 1 | 2 | 3 | 4 |
| Temp ° C | | | | | |
| Day | | 25° | 25° | 25° | 25° |
| Night | | 17° | 17° | 17° | 17° |
| Day length hrs | | 10 | 14 | 14 | 14 |
| Humidity % | | | 50%-60% | | |
| Nutrient Solution PPM | | | | | |
| K | | 390. | 390. | 390. | 390. |
| P | | 31. | 31. | 31. | 31. |
| N | | 310. | 310. | 310. | 400. |
| Ca | | 180. | 180. | 250. | 250. |
| Mg | | 24. | 24. | 24. | 24. |
| B | | .25 | .25 | .3 | .3 |
| Fe | | .5 | .5 | .5 | .5 |
| Mn | | .25 | .25 | .25 | .25 |
| Micro Nutrients | | | | | |
| Cu | | .05 | .05 | .05 | .05 |
| Zn | | .05 | .05 | .05 | .05 |
| $H_2O$ ph | | | 6 to 6.5 | | |
| $CO_2$ PPM | | 1000 | 1000 | 1000 | Ethylene 300 ppm |
| Hormones | | | | | |
| Light Intensity foot candles | | | | | |
| Other | | | | | |

PHLEUM PRATENSE

| | | | Grass | | |
|---|---|---|---|---|---|
| | PHASE | 1 | flower induct | | |
| | | 2 | flower initiation | | |
| | | 3 | dev. of inflor | | |
| | | 4. | | | |
| Phase | | 1 | 2 | 3 | 4 |
| Temp ° C | | | | | |
| Day | | 14° | 23° | 23° | |
| Night | | 10° | 10° | 10° | |
| Day length hrs | | 12 | 16 | 16 | |
| Humidity % | | | 60% to 70° | | |
| Nutrient Solution PPM | | | | | |
| K | | 390. | 390. | 390. | |
| P | | 31. | 31. | 31. | |
| N | | 310. | 310. | 400. | |
| Ca | | 180. | | 250. | |
| Mg | | 24. | 24. | 24. | |
| B | | .25 | .25 | .3 | |
| Fe | | .5 | .5 | .5 | |
| Mn | | | | | |
| Micro Nutients | | | | | |
| Cu | | .05 | .05 | .05 | |
| Zn | | .05 | .05 | .05 | |
| $H_2O$ ph | | 6.-6.5 | 6.-6.5 | 6.-6.5 | |
| $CO_2$ PPM | | 1000 | | | |
| Hormones | | $GA_3$ after long day | | | |
| Light Intensity foot candles | | 2000-3000 fc | | | |

-continued

PHLEUM PRATENSE
Grass
PHASE 1 flower induct
2 flower initiation
3 dev. of inflor
4.

| Phase | 1 | 2 | 3 | 4 |
|---|---|---|---|---|
| Other | | | | |

PISUM STIVUM
Pea
PHASE 1 Flower induct
2 flower initiation
3 dev. of inflor
4.

| Phase | 1 | 2 | 3 | 4 |
|---|---|---|---|---|
| Temp ° C | | | | |
| Day | 23° | 17° | 14° | 14° |
| Night | 17° | 14° | 10° | 10° |
| Day length hrs | 16 | 16 | 16 | 16 |
| Humidity % | | 50% to 60° | | |
| Nutrient Solution PPM | | | | |
| K | 390. | 390. | 390. | 390. |
| P | 31. | 31. | 31. | 31. |
| N | 150. | 150. | 150. | 200. |
| Ca | 180. | 180. | 250. | 250. |
| Mg | 24. | 24. | 24. | 24. |
| B | .25 | .25 | .3 | .25 |
| Fe | .5 | .5 | .5 | .5 |
| Mn | .25 | .25 | .25 | .25 |
| Micro Nutients | | | | |
| Cu | .05 | .05 | .05 | .05 |
| Zn | .05 | .05 | .05 | .05 |
| H$_2$O ph | | | | |
| CO$_2$ PPM | | | | |
| Hormones | | | | Ethylene 300 ppm |
| Light Intensity foot candles | | 1400 fc | | |
| Other | | | | |

CAPSICUM ANNUUM
Pepper
Phase 1 seedling to bud
2 bud to flower
3 flower to fruit
4 fruit set to harvest

| Phase | 1 | 2 | 3 | 4 |
|---|---|---|---|---|
| Temp ° C | | | | |
| Day | 27° | 23° | 23° | 23° |
| Night | 21° | 16° | 16° | 16° |
| Day length hrs | 16 | 16 | 16 | 16 |
| Humidity % | | 60% – 70% | | |
| Nutrient Solution PPM | | | | |
| K | 390. | 390. | 390. | 390. |
| P | 31. | 31. | 31. | 31. |
| N | 310. | 310. | 310. | 400. |
| Ca | 180. | 180. | 250. | 250. |
| Mg | 24. | 24. | 24. | 24. |
| B | .25 | .25 | .3 | .25 |
| Fe | .5 | .5 | .5 | .5 |
| Mn | .25 | .25 | .25 | .25 |
| Micro Nutients | | | | |
| Cu | .05 | .05 | .05 | .05 |
| Zn | .05 | .05 | .05 | .05 |
| H$_2$O ph | | 6.5 – 7. | | |
| CO$_2$ PPM | | | | |
| Hormones | | | Auxin | Ethylene 300 ppm |
| Light Intensity foot candles | 2000-3000 fc | | | |
| Other | | | | |

FRAGARIA
Strawberry
PHASE 1 transplant to bud
2 bud to flower
3 flower to fruit
4 fruit set to harvest

| Phase | 1 | 2 | 3 | 4 |
|---|---|---|---|---|
| Temp ° C | | | | |
| Day | 14°-17° | 14° | 14° | 20° |
| Night | 6°-10° | 6°-10° | 6°-10° | 12° |
| Day length hrs | 8 | 8 | 8 | 8 |
| Humidity % | | 50% to 60% | | |
| Nutrient Solution PPM | | | | |
| K | 195. | 195. | 195. | 195. |
| P | 15. | 15. | 15. | 15. |
| N | 150. | 150. | 150. | 150. |
| Ca | 90. | 90. | 120. | 120. |
| Mg | 12. | 12. | 12. | 12. |
| B | .13 | .13 | .2 | .2 |
| Fe | .25 | .25 | .25 | .25 |
| Mn | .12 | .12 | .12 | .12 |
| Micro Nutients | | | | |
| Cu | .03 | .03 | .03 | .03 |
| Zn | .03 | .03 | .03 | .03 |
| H$_2$O ph | | 6 – 6.5 | | |
| CO$_2$ PPM | 1000 | 1000 | 1000 | 1000 |
| Hormones | | Abscinsin 150ppm daily | 300 ppm | Ethylene |
| Light Intensity foot candles | 1000 | incandescent far red | | 1500 |
| Other | | | | |

Now referring to FIG. 5, the first step under these control conditions is to sterilize the medium and the surrounding equipment which might transport disease or pests. The medium may be loam, sand, foam plastic, or for that matter, the trays may be of a hydroponic type with a liquid medium employed. Since each tray is an individual growing chamber independent from each other as far as liquid nutrients is concerned, the danger of cross contamination where disease enters a common nutrient system is minimized in accordance with this invention. In any event, before each cycle, sterilization of the growing medium is recommended. Thereafter, with a single workman located at the work station of the device of FIGS. 1, 2 or 3, one can plant in the required space, seeds or seedlings in each of the trays. Thereafter, during the germination or seedling growth period, the atmosphere, temperature and photo periodicity or day length may be controlled as well as chamber humidity. Throughout this seedling growth period the trays are supplied with water and nutrient mix. Optionally, during the seedling growth period, harmones may be added in accordance with known agricultural practice.

As soon as buds form the growing cycle changes and each of the controls of temperature, photo periodicity, CO$_2$ and humidity also may be changed to optimum values employing the controls of the chamber. During this period of time, trimming, thinning and training of the plants may be carried out. This again is carried out by the same or other workman located at the same work station, with each of the trays of growing plants brought periodically to the worker. The fact that each tray passes the work station and travels an arcuate route allows the worker to view the tray and its plantings from a continually changing angle whereby different view of each tray are seen by the worker on each pass. All actions must be performed by the worker are effectively carried out and no action missed by reason of obstructions to view by the plant foliage, as commonly occurs in garden or acreage maintenance. Therefore, the trimming, thinning and training of the plant is more easily and effectively carried out.

As the plant approaches the flowering stage, again the parameters are all controllable and may be changed to the optimum value. Throughout the process as described to date, the plants are maintained in movement. This movement is also employed to bring the fully mature plants and fruit to the worker at the work station, where it now becomes a harvesting station. After the harvest, the plants are removed and the medium again sterilized, ready to begin the next planting.

It should be noted that in the above process, at all times the temperatures, humidity, photo periodicity, $CO_2$ content and plant movement are all determined by the environmental chamber and not subject to the vagaries of nature.

Figure 6:
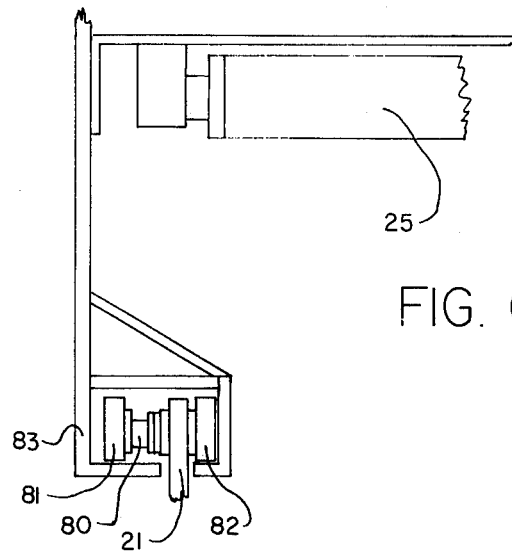
FIG. 6 is a fragmentary vertical sectional view of an alternate suspension system for this invention.

In carrying out the invention of FIGS. 1 through 3, the lamps providing illumination are all located on an upper horizontal surface such as the top of the enclosure 12 of FIG. 1. This places the lamps 25 in horizontal rows extending transverse to the direction of travel of trays 20. These trays 20 are suspended in the embodiment of FIG. 1 from a closed channel track as illustrated in FIG. 6. There the hanger 21 is supported on an axle 80 carrying a pair of rollers 81 and 82, each of which rest on the bottom surface of the channel support 83. The trays 20, unshown in FIG. 6 but carried by the respective hangers 21, are positioned directly below the lamp 25.

As indicated above in connection with FIGS. 1-3, periodicity of light illumination is achieved by the cyclical route past a single bank of lamps as shown in FIG. 1.

Figure 7:
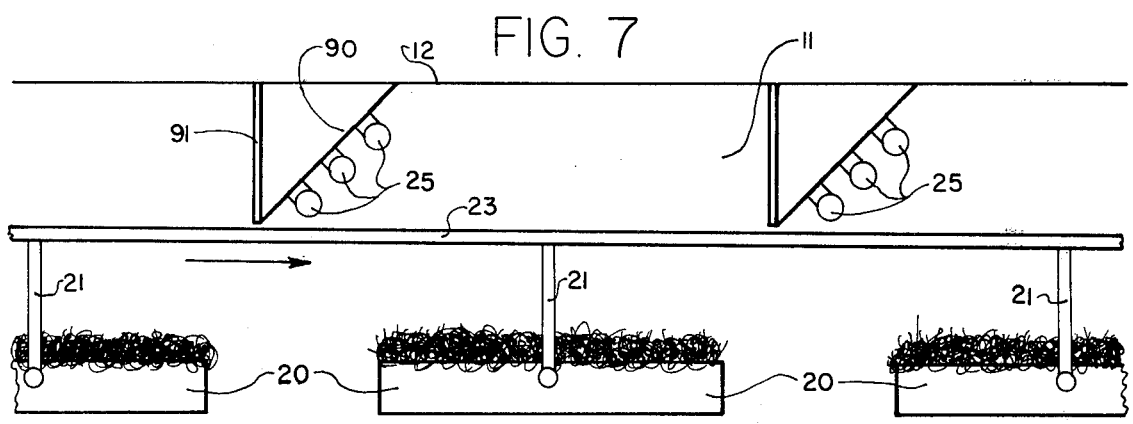
FIG. 7 is a side elevational view of the alternate lighting arrangement of this invention.

Photo periodicity may also be achieved in accordance with the alternate embodiment shown in FIG. 7. In FIG. 7 the same numerical designations are given to identical parts in order to illustrate clearly the new elements present.

Figure 8:
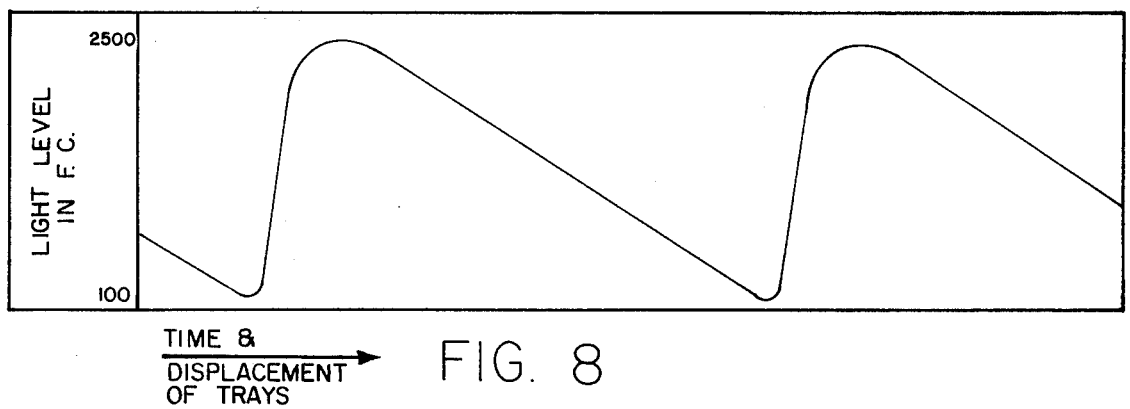
FIG. 8 is a graphical representation of the light level position and time relationship in the embodiment of FIG. 7.

In FIG. 7, the enclosure includes a top wall 12 and a side wall 11, and carried within the enclosure on the closed circular drive system 23 are the hangers 21, each carrying the respective tray 20. In this case, the lamps 25 are mounted on inclined surfaces 90 inclined in the direction of travel of the trays 20 as indicated by the arrow of FIG. 7. The inclined surface 90 is backed by a support member light barrier 91 which prevents radiation from the rear of the lamps 25 against the direction of the arrow. Given this angular array of the lamps 25, a cyclical lighting level relationship exists as the trays move from left to right in FIG. 7. This lighting level change is illustrated graphically in FIG. 8 which is aligned geometrically with the lamp arrays 25 of FIG. 7. It is apparent in FIG. 8 that light level immediately prior to the passage of the barrier 91 is at lowest level, for example 100 foot candles at the level of the trays 20, and shortly thereafter as a tray 20 is directly beneath all three lamps as shown, the level reaches as high as 2,500 foot candles or greater by a factor of 25. Thereafter, as the trays 20 move to the right, the level falls relatively uniformly until it reaches the lowest level immediately before reaching the second array of lamps 25, those appearing at the right in the drawing, FIG. 7. It should be noted that a degree of photo periodicity then is therefore achieved on a single pass beneath the lamps. Given this arrangment, the photo period may be changed to a matter of minutes, if desired, as compared with hours in connection with the normal usage of the embodiments of FIGS. 1 and 3. Continuing studies are revealing more and more information about photo periodicity and it appears that the duration periods may have enhanced value in promoting growth. The embodiment of FIG. 7 is conducive to shorter periods.

In each of the embodiments described above and the process of FIG. 5, the complete control of the growth of ornamental and food plants may be achieved. Moreover, the manual operations necessary in any effective growth are all performed from one work station which allows either standing or sitting operation. As each tray of plants reaches the worker it traverses an arcuate path thereby exposing the entire tray to visual inspection and manual operations at convenient angles. Photo periodicity is achieved by arrangement of banks of lamps as shown in FIG. 7 or by use of a cyclical path with only part of the path illuminated as shown in FIG. 3.

The novel process of this invention involves the addition to the natural growing process of cyclical movement of the plants past illumination sources for photo periodicity and to provide relative movement of the plants for enhanced growth. Movement to the work station allows one worker to perform all required farming operations from one location without stooping.

In the foregoing description, reference to light sources and photo periodicy has been directed principally to fluorescent lamps and periods of several minutes or hours for cycle length. Recent developments in the field, as described in *Organismic Biology*, copyright 1975, McGraw Hill Publishing Company, New York, N.Y., pages 360-61, indicate microsecond to one second pulses of light appear to enhance growth of certain food plants. Photo periodicity of such periods may be obtained in carrying out our invention by pulsing the fluorescent lamp or through the use of xenon or other high intensity pulsed light sources.

The above described embodiments of this invention are merely descriptive of its principles and are not to be considered limiting. The scope of this invention instead shall be determined from the scope of the following claims including their equivalents.

What is claimed is:

1. An environmentally controlled growing chamber comprising;

a substantially closed elongated chamber;

means for supplying selected gaseous atmosphere to the chamber to support growth of the plants therein;

lamp means positioned to radiate over a longitudinally extending region within said chamber;

a plurality of plant holding means;

means for transporting said plant holding means through said longitudinally extending region to expose plants therein to illumination through said lamp means;

said transport means including continuous conveying means including end sprockets journaled about generally horizontal axes for reversing the direction of the plant carrying means to transport the plant carrying means through said illuminated longitudinally extending region and retrace through a region of lesser illumination;

said chamber including a work station located adjacent to one of said end sprockets from which all manual plant tending may be performed on plants in said plant carrying means as the plants move around said end sprocket between said regions;

whereby a worker at said work station has access to all plants in the said plant carrying means during each cycle of movement of said transport means and successive access to and ready view of the top of the foliage of the plant, the sides thereof, and the stem portion and planting soil as plants transverse the end sprocket region without the need of stooping.

2. An environmental controlled growing chamber comprising:

a substantially closed chamber;

means for supplying gaseous atmosphere to said chamber to support growth of plants therein;

lamp means positioned to radiate over a longitudinally extending region within said chamber;

a plurality of plant holding means;

transport means for cyclically passing said plant holding means through said region exposed to radiation from said lamp means;

wherein said lamp means comprises at least two banks of lamps;

said banks of lamps displaced longitudinally with respect to the path of cyclical passing of the plant holding means;

each of said bank of lamps includes a plurality of lamps so positioned and oriented that the light level at the plant holding means varies between a maximum and minimum level during a single passage beneath each bank of lamps whereby photo periodicity is achieved; and wherein each of said banks of lamps are concentrated in one region and there is a region without illumination source between the first bank of lamps and the second of at least two banks of lamps;

including light blocking means on one side of each bank of lamps to reduce radiation toward said plant transporting means in one direction;

each of said banks of lamps including lamp support means mounting a plurality of said lamps closely spaced on an inclined surface plane with respect to the direction of the movement of the plant holding means;

whereby the variation between maximum and minimum light level during a single passage beneath a bank of lights is achieved.

* * * * *